United States Patent
Khan et al.

(10) Patent No.: US 8,331,342 B2
(45) Date of Patent: Dec. 11, 2012

(54) APPARATUS AND METHOD FOR SWITCHING BETWEEN SINGLE USER AND MULTI-USER MIMO OPERATION IN A WIRELESS NETWORK

(75) Inventors: Farooq Khan, Allen, TX (US); Cornelius Van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1030 days.

(21) Appl. No.: 11/738,074

(22) Filed: Apr. 20, 2007

(65) Prior Publication Data
US 2007/0254652 A1   Nov. 1, 2007

Related U.S. Application Data

(60) Provisional application No. 60/795,747, filed on Apr. 28, 2006.

(51) Int. Cl.
*H04B 7/208* (2006.01)

(52) U.S. Cl. ........ 370/344; 370/208; 370/310; 370/334; 370/335; 370/337; 370/338; 370/342; 370/347; 375/141; 375/144; 375/148; 375/260; 375/267; 455/24; 455/69; 455/511; 455/513; 455/526

(58) Field of Classification Search ............. 370/310, 370/334, 338; 375/141, 144, 148, 260, 267; 455/24, 511, 513, 526, 69
See application file for complete search history.

(56) References Cited

U.S. PATENT DOCUMENTS

| | | | |
|---|---|---|---|
| 7,751,352 B2 * | 7/2010 | Seo et al. ............. | 370/310 |
| 2004/0136349 A1 * | 7/2004 | Walton et al. ......... | 370/338 |
| 2005/0094603 A1 * | 5/2005 | Kim et al. ............. | 370/334 |
| 2005/0099937 A1 | 5/2005 | Oh et al. | |
| 2005/0233709 A1 * | 10/2005 | Gardner et al. ....... | 455/101 |
| 2006/0121946 A1 * | 6/2006 | Walton et al. ......... | 455/561 |
| 2006/0146755 A1 * | 7/2006 | Pan et al. ............. | 370/334 |
| 2007/0147536 A1 * | 6/2007 | Melzer et al. ......... | 375/267 |
| 2007/0160156 A1 * | 7/2007 | Melzer et al. ......... | 375/260 |
| 2007/0165576 A1 * | 7/2007 | Wang et al. .......... | 370/335 |
| 2008/0253469 A1 * | 10/2008 | Ma et al. ............. | 375/260 |

FOREIGN PATENT DOCUMENTS

WO   WO 02/49306 A2   6/2002

OTHER PUBLICATIONS

Cheong Yui Wong et al., "Multiuser OFDM with Adaptive Subcarrier, Bit, and Power Allocation," IEEE Journal on Selected Areas in Communications, vol. 17, No. 10, Oct. 1999, pp. 1747-1758.

Ya-Han Pan et al., "Space-time Coded Adaptive Transmit Antenna Arrays for OFDM Wireless Systems Utilizing Channel Side Information," 2003 IEEE, pp. 1127-1131.

* cited by examiner

*Primary Examiner* — Rafael Pérez-Gutiérrez
*Assistant Examiner* — Liton Miah

(57) ABSTRACT

A base station for use in a wireless network, wherein the base station transmits in a downlink to a plurality of subscriber stations using a plurality of antennas according to a multiple input, multiple-output (MIMO) protocol. During a first downlink subframe, the base station operates in single-user MIMO mode in which the base station transmits a first data subpacket to a first subscriber station using a first antenna and transmits a second data subpacket to the first subscriber station using a second antenna. During a second downlink subframe following the first downlink subframe, the base station operates in multi-user MIMO mode in which the base station transmits a third data subpacket to the first subscriber station using the first antenna and transmits a fourth data subpacket to a second subscriber station using the second antenna.

21 Claims, 12 Drawing Sheets

APPARATUS AND METHOD FOR SWITCHING BETWEEN SINGLE USER AND MULTI-USER MIMO OPERATION IN A WIRELESS NETWORK

CROSS-REFERENCE TO RELATED APPLICATION(S) AND CLAIM OF PRIORITY

The present application is related to U.S. Provisional Patent No. 60/795,747, filed Apr. 28, 2006, entitled "Method For Dynamic Switching Between Single-User And Multi-User MIMO". U.S. Provisional Patent No. 60/795,747 is assigned to the assignee of the present application and is hereby incorporated by reference into the present application as if fully set forth herein. The present application hereby claims priority under 35 U.S.C. §119(e) to U.S. Provisional Patent No. 60/795,747.

TECHNICAL FIELD OF THE INVENTION

The present application relates generally to wireless communications and, more specifically, to an apparatus for dynamically switching between single-user and multi-user MIMO operation in a wireless network.

BACKGROUND OF THE INVENTION

Multiple-input, multiple-output (MIMO) communications are well-known techniques for improving the capacity and reliability of a wireless communication channel. A conventional MIMO wireless system uses multiple transmit antennas and multiple receive antennas to provide a linear increase in capacity with K, where K is the minimum of number of transmit (M) antennas and receive antennas (N) (i.e., K=min (M,N)). By way of example, a conventional 4×4 MIMO system transmits four different data streams separately from four transmit antennas of a base station. The four transmitted signals are received at the four receive antennas of a subscriber station.

The subscriber station (SS) then performs some form of spatial signal processing on the received signals in order to recover the four data streams. By way of example, the subscriber station (or user device) may perform a spatial signal processing technique known as V-BLAST, which uses successive interference cancellation principle to recover the transmitted data streams. Other variants of MIMO techniques may include some type of space-time coding across the transmit antennas (e.g., D-BLAST) or may include a beamforming technique, such as spatial division multiple access (SDMA).

In the case of a single-code word MIMO transmission, the base station (BS) adds a cyclic redundancy check (CRC) block to a single data block and then performs coding and modulation on the combined CRC and data blocks. The coded and modulated symbols are then demultiplexed for transmission over multiple antennas. In the case of multiple-code word MIMO transmission, the base station demultiplexes a data block into smaller data blocks and attaches individual CRC blocks to the smaller data blocks. The base station then performs separate coding and modulation operations on the smaller combined CRC and data. The smaller data and CRC blocks are then transmitted via separate MIMO antennas or beams.

It should be noted that in case of multi-code word MIMO transmissions, different modulation and coding techniques may be used on each of the individual streams, resulting in a so-called PARC (per antenna rate control) scheme. Also, multi-code word transmission allows for more efficient post-decoding interference cancellation, because a CRC check can be performed on each of the code words before the code word is cancelled from the overall signal. In this way, only correctly received code words are cancelled, thereby avoiding any interference propagation in the cancellation process.

Hybrid acknowledge request (ARQ) is a retransmission technique whereby the transmitter sends redundant coded information (e.g., parity bits in turbo coding) in small increments (or subpackets). The subpackets are generated at the transmitter by first performing channel coding on the information packet and then breaking the resulting coded bit stream into smaller units called subpackets. For example, an original data packet P and the corresponding parity bits may be broken into subpackets SP1, SP2, SP3, . . . , SPn. The receiver tries to decode the information and recover the original data packet P after receiving the first subpacket SP1. In case of unsuccessful decoding, the receiver stores the SP1 and sends a NACK message to the transmitter.

After receiving the NACK message, the transmitter transmits the second subpacket SP2. After receiving the second subpacket, the receiver combines subpacket SP2 with the previously stored subpacket SP1 and jointly decodes subpackets SP1 and SP2 in order to recover original data packet P. At any point, if the information packet is successfully decoded (e.g., by a successful cyclic redundancy check (CRC) operation), the receiver sends an ACK message to the transmitter. After receiving an ACK message, the transmitter moves on to the transmission of a new information packet to the same or a different subscriber station (or user).

One of the disadvantages of a single-user MIMO PARC transmission scheme is that multiple channel quality indicator (CQI) feedback estimates are required for each of the individual streams. This requires excessive signaling overhead and results in system inefficiency. In a multi-user MIMO system, it is possible to implement a PARC transmission scheme with just one CQI feedback estimate per subscriber station. In such a case, each subscriber station (or user) reports the best CQI estimate determined by using, for example, an MMSE algorithm along with the MIMO stream identity.

A multi-user MIMO system requires that a large number of subscriber stations are present in the system, so that each subscriber station can be selected for transmission when it experiences the best channel quality. If the number of subscriber stations in the system is small, the system is less likely to find subscriber stations experiencing peak channel conditions. This degrades the performance of a multi-user MIMO scheme. In the presence of a small number of subscriber station, it is advantageous to schedule multiple MIMO streams to the same subscriber station using single-user MIMO transmission mode. The number of subscriber stations with traffic buffers that are not empty varies dynamically due to packet data traffic burst characteristics. It should be noted that, for single-user MIMO mode, multiple CQI feedback values are required, while in multi-user MIMO mode, a single CQI feedback value per subscriber station may suffice.

In sum, in conventional wireless networks, a MIMO system operates either in single user (or single subscriber station) MIMO mode or in multi-user (multi-subscriber station) MIMO mode. System performance is better for the single-user MIMO case when the number of subscriber stations in the system is small. On the other hand, a multi-user MIMO system gives better performance in the presence of large number of subscriber stations.

Furthermore, the number of subscriber stations having data to receive or to transmit in a system may vary dynamically due to the bursty nature of the traffic. Subscriber stations are not aware of the dynamic traffic situation in the base station and, therefore, cannot switch the mode of CQI feedback between single-user and multi-user CQI feedback. As a result, conventional MIMO schemes result in inefficient use of system capacity and resources.

Therefore, there is a need in the art for an improved wireless network capable of dynamically switching between single-user and multi-user MIMO modes. In particular, there is a need for a wireless network capable of dynamically switching between single-user and multi-user MIMO modes with minimal signaling overhead.

SUMMARY OF THE INVENTION

In a first embodiment of the present disclosure, there is provided a base station for use in a wireless network. The disclosed base station transmits in a downlink to a plurality of subscriber stations using a plurality of antennas according to a multiple input, multiple-output (MIMO) protocol. The base station during a first downlink subframe operates in single-user MIMO mode in which the base station transmits a first data subpacket to a first subscriber station using a first antenna and transmits a second data subpacket to the first subscriber station using a second antenna. During a second downlink subframe following the first downlink subframe, the base station operates in multi-user MIMO mode in which the base station transmits a third data subpacket to the first subscriber station using the first antenna and transmits a fourth data subpacket to a second subscriber station using the second antenna.

In one embodiment, the first data subpacket is generated from a first original data packet and the second data subpacket is generated from a second original data packet different than the first original data packet. The third data subpacket is also generated from one of the first and second original data packets.

In another embodiment of the present disclosure, there is provided a subscriber station capable of communicating with a base station of a wireless network, wherein the base station is capable of transmitting in a downlink using a plurality of antennas according to a multiple input, multiple-output (MIMO) protocol. The disclosed subscriber station, during a first downlink subframe in which the base station operates in single-user MIMO mode, receives a first data subpacket transmitted from a first antenna of the base station and receives a second data subpacket transmitted from a second antenna of the base station. During a second downlink subframe following the first downlink subframe in which the base station operates in multi-user MIMO mode, the subscriber station receives a third data subpacket transmitted from the first antenna of the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure provides dynamic switching between single-user MIMO mode and multi-user MIMO mode. In single-user MIMO mode, multiple streams are transmitted to a single user (or subscriber station), whereas in multi-user MIMO mode, multiple streams are transmitted to multiple users (subscriber stations). According to the principles of the present disclosure, a subscriber station always reports a single CQI feedback value on the assumption that multi-user MIMO mode is in operation. However, when a base station schedules a subscriber station to operate in a single-user MIMO mode, the base station uses the best stream CQI feedback value reported by the subscriber station to select modulation and coding schemes for all the MIMO streams directed to that subscriber station. As this CQI value only applies to one stream, hybrid ARQ operation is used for recovery of the remaining streams.

In some cases, when the best CQI stream is not decoded, the subscriber station may try to decode the other streams nonetheless. If the subscriber station successfully decodes one or more other streams, the subscriber station may cancel the successfully decoded streams from the overall received signal to reduce the interference from the overall received signal. After interference cancellation, the subscriber station may again attempt to decode the streams that previously failed.

In the exemplary embodiment described herein, the present disclosure is implemented in a wireless network in which multi-antenna base stations transmit to subscriber stations (i.e., user devices) according to an orthogonal frequency division multiplexing (OFDM) or orthogonal frequency division multiple access (OFDMA) protocol. The base station uses multiple-input, multiple-output (MIMO) antennas to implement spatial division multiplexing techniques. Unlike conventional MIMO implementations, the disclosed base station may transmit to the same subscriber station from multiple antennas using different subcarriers on each antenna, depending on the fading of the subcarriers from each antenna.

However, the implementation of the present disclosure in an OFDMA network should not be construed so as to limit the scope of the present disclosure. In alternate embodiments, the present disclosure may be implemented in, for example, a GSM network, a CDMA2000 network, or the like.

Figure 1:
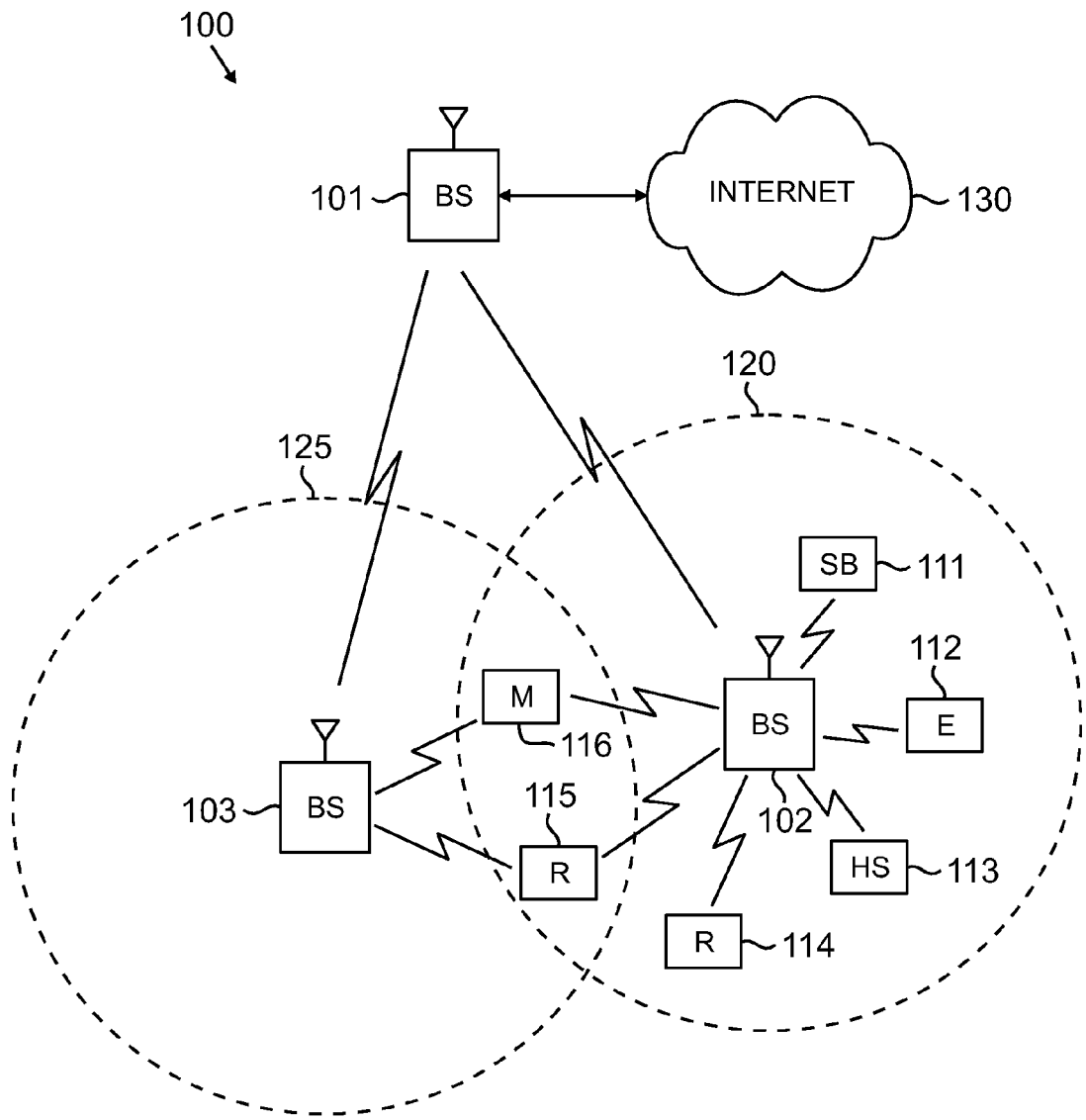
FIG. 1 illustrates an exemplary orthogonal frequency division multiple access (OFDMA) wireless network that dynamically switches between single-user and multi-user MIMO operation according to the principles of the present disclosure.

FIG. 1 illustrates exemplary orthogonal frequency division multiple access (OFDMA) wireless network 100, which dynamically switches between single-user and multi-user MIMO operation according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

In an advantageous embodiment of the present disclosure, each one of base stations 101-103 uses multiple antennas to transmit data to each subscriber station in the downlink and to receive data from each subscriber stations in the uplink. According to the principles of the present disclosure, each one of base stations 101-103 is capable of transmitting data to a selected subscriber station using one group of subcarriers (or subband) on a first antenna and a different group of subcarriers (or subband) on a second antenna. For example, BS 102 may transmit downlink data to SS 116 from a first antenna (ANT1) using a first group of 64 subcarriers (i.e., Subband1) and may simultaneously transmit downlink data to SS 116 from a second antenna (ANT2) using a second group of 64 subcarriers (i.e., Subband2). At the same time, BS 102 may transmit downlink data to SS 115 from antenna ANT1 using Subband2 and may simultaneously transmit downlink data to SS 115 from antenna ANT2 using Subband1. Since the fading at the receiver from each antenna is independent of the other antennas, the allocation of subbands at each antenna is independent of the allocations of subbands at other antennas. Thus, the allocations of subbands are done on an antenna-by-antenna basis.

Figure 2A:
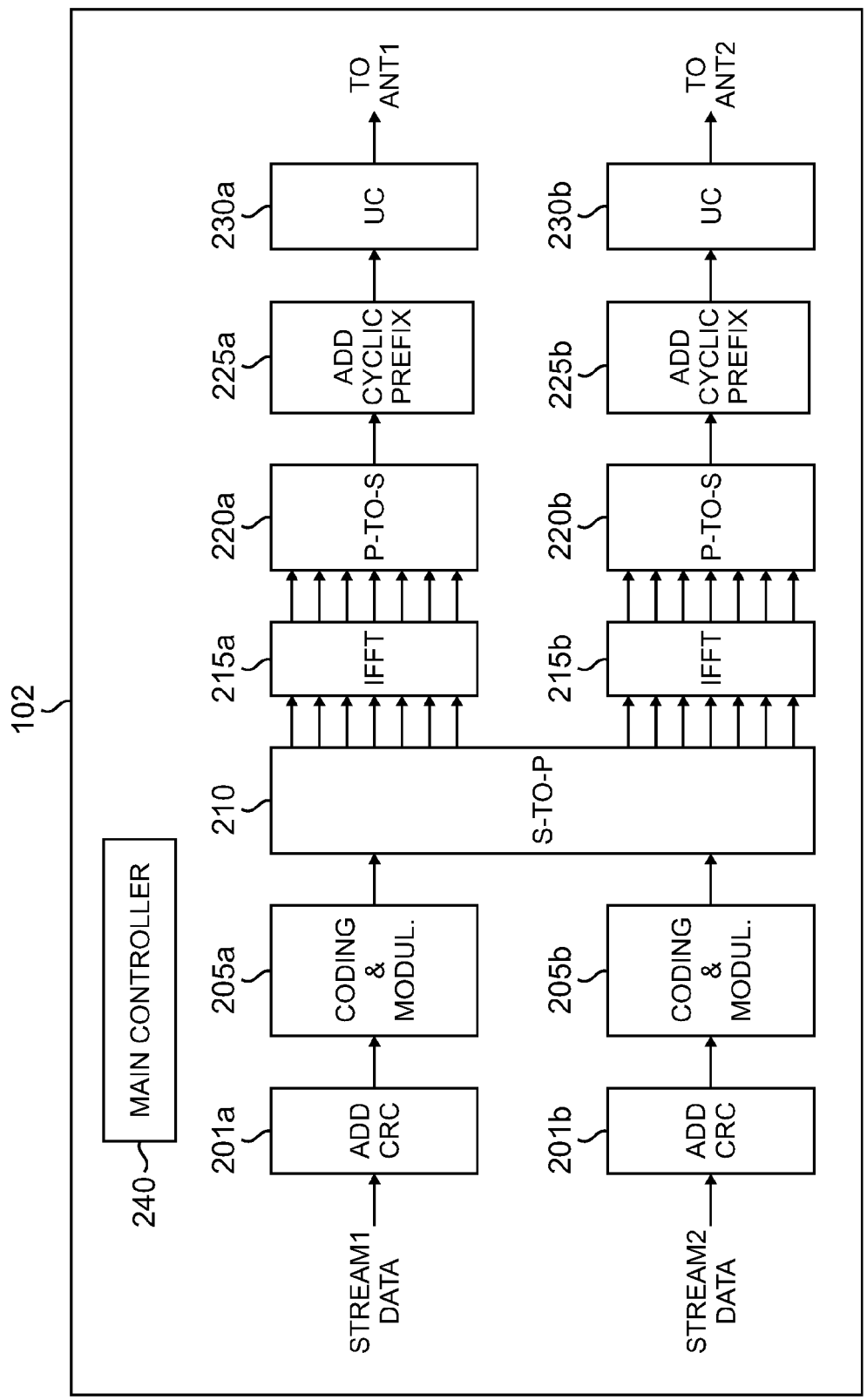
FIG. 2A is a high-level diagram of an orthogonal frequency division multiple access (OFDMA) transmit path.
Figure 2B:
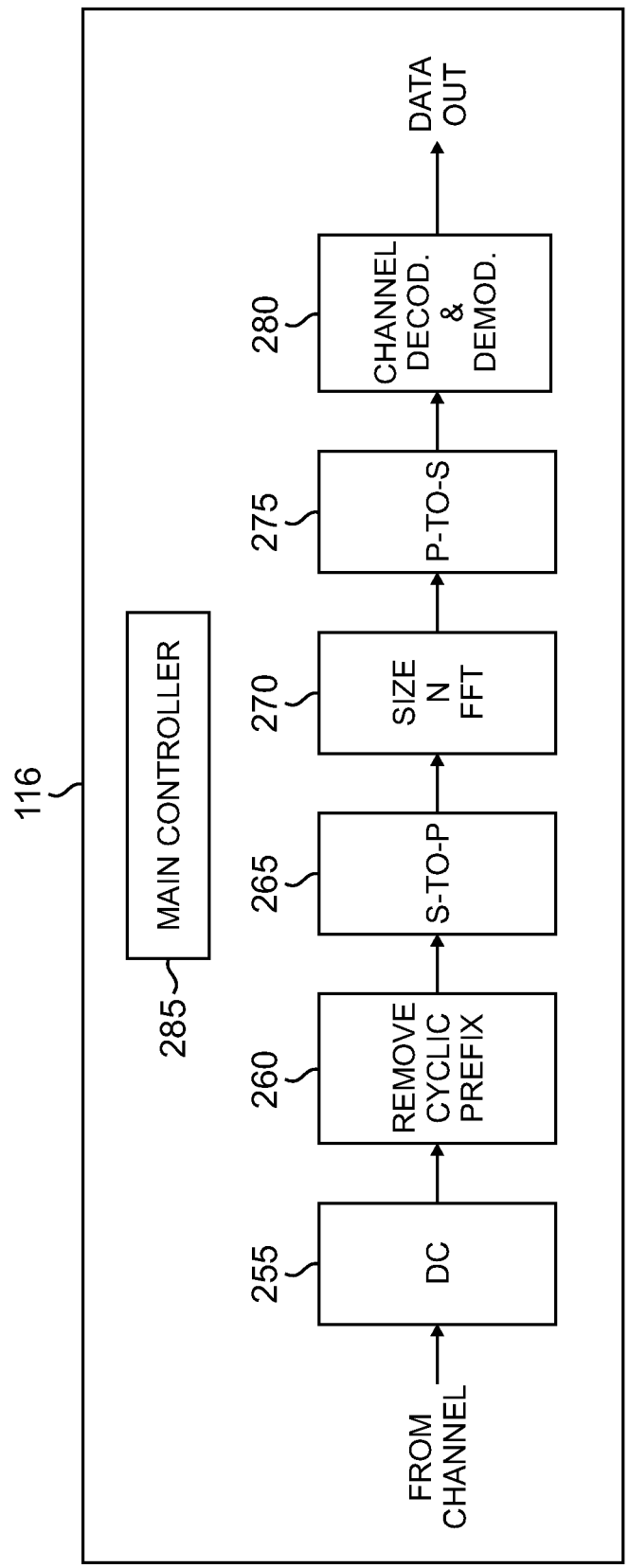
FIG. 2B is a high-level diagram of an orthogonal frequency division multiple access (OFDMA) receive path.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that a similar (though not identical) OFDMA receive path may also be implemented in BS 102 and a similar (though not identical) OFDMA transmit path may be implemented in SS 116.

For the purposes of simplicity and clarity, the embodiment in FIG. 2A illustrates two transmit paths that may send data in multi-user mode to, for example, two subscriber stations (e.g., SS 116 and SS 115) via two transmit antennas, ANT1 and ANT2 (not shown), or that may send data in single-user mode to one subscriber station (e.g., SS 116) via two transmit antennas, ANT1 and ANT2. However, this is by way of illustration only and should not be construed to limit the scope of the disclosure.

More generally, a base station according to the present disclosure may use N transmit antennas to transmit data to M subscriber stations using selective allocation of different groups of subcarriers to different transmit antennas. Moreover, the base station also may employ some form of precoding on the data streams before mapping of the data symbols to physical antennas, thus creating a set of beams or virtual antennas. The principles of the present disclosure in this case apply equally to the beams or virtual antennas as if they are physical antennas.

A first transmit path is directed to antenna ANT1 (not shown) and a second transmit path is directed to antenna ANT2 (not shown). The first transmit path comprises add cyclic redundancy check (CRC) block 201a, channel coding and modulation block 205a, serial-to-parallel (S-to-P) block 210, IFFT block 215a, parallel-to-serial (P-to-S) block 220a, add cyclic prefix (CP) block 225a, and up-converter (UC) block 230a. The second transmit path comprises add cyclic redundancy check (CRC) block 201b, channel coding and modulation block 205b, serial-to-parallel (S-to-P) block 210, IFFT block 215b, parallel-to-serial (P-to-S) block 220b, add cyclic prefix (CP) block 225b, up-converter (UC) block 230b.

Base station 102 further comprises main controller 204, which may be, for example, a microprocessor or a microcontroller. Main controller 204 controls the overall operation of BS 102, including switching BS 102 between single-user mode and multi-user mode according to the principles of the present disclosure.

The receive path in subscriber station (SS) 116 (or 115) comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280, and main controller 285. Main controller 285 controls the overall operation of SS 116, including switching SS 116 between operating in a single-user network environment and operating in a multi-user network environment according to the principles of the present disclosure.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms executed by a processor, where the value of Size N may be modified according to the implementation.

In BS 102, add CRC block 201a receives a first block of data, Stream1 Data, which may be transmitted to, for example, SS 116 via antennas ANT1 and ANT2 in single user mode, or to SS 116 or SS 115, or both, via antennas ANT1 and ANT2 in multi-user mode. Add CRC block 201a performs a cyclic redundancy check operation that adds a CRC value to the Stream1 Data block.

Channel coding and modulation block 205a receives input bits from add CRC block 201a and applies coding (e.g., turbo coding) and modulates (e.g., BPSK, QPSK, QAM, etc.) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102, SS 116, and SS 115.

Size N IFFT block 215a performs an IFFT operation on the N parallel symbol streams to produce time-domain output signals. Parallel-to-serial block 220a converts (i.e., multiplexes) the parallel time-domain output symbols from Size N IFFT block 215a to produce a serial time-domain signal. Add cyclic prefix block 225a then inserts a cyclic prefix to the time-domain signal. Finally, up-converter 230a modulates (i.e., up-converts) the output of add cyclic prefix block 225a to RF frequency for transmission via antenna ANT1.

Similar operations occur in the second transmit path. Add CRC block 201b receives a first block of data, Stream2 Data, which may be transmitted to, for example, SS 116 via antennas ANT1 and ANT2 in single user mode, or to SS 116 or SS 115, or both, via antennas ANT1 and ANT2 in multi-user mode. Add CRC block 201b performs a cyclic redundancy check operation that adds a CRC value to the Stream2 Data block.

Channel coding and modulation block 205b receives input bits from add CRC block 201b and applies coding (e.g., turbo coding) and modulates (e.g., BPSK, QPSK, QAM, etc.) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102, SS 116, and SS 115.

Size N IFFT block 215b performs an IFFT operation on the N parallel symbol streams to produce time-domain output signals. Parallel-to-serial block 220b converts (i.e., multiplexes) the parallel time-domain output symbols from Size N IFFT block 215b to produce a serial time-domain signal. Add cyclic prefix block 225b then inserts a cyclic prefix to the time-domain signal. Finally, up-converter 230b modulates (i.e., up-converts) the output of add cyclic prefix block 225b to RF frequency for transmission via antenna ANT2.

The transmitted RF signals from antennas ANT1 and ANT2 arrive at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

The transmit path and receive path components described herein and illustrated in FIGS. 2A and 2B are configurable devices that may be re-programmed and controlled by main controller 240 in BS 102 or main controller 285 in SS 116. Thus, for example, main controller 240 is operable to configure modulation block 205 to adapt to different modulation techniques (e.g., BPSK, QPSK, QAM, etc.). Similarly, main controller 285 is operable to similarly configure demodulation block 280. Main controllers 240 and 285 are also operable to modify the value of Size N.

There may be a large number of subscriber stations present in wireless network 100. Due to the bursty nature of data traffic, typically only a few subscriber stations are scheduled to receive a transmission at a given time. A mechanism for dynamic allocation of ACK/NACK channels was disclosed in U.S. patent application Ser. No. 11/390,056, which is hereby incorporated by reference. Main controllers 235 and 285 are operable to allocate uplink channel resources to subscriber stations 111-116 as described in U.S. patent application Ser. No. 11/390,056.

In one embodiment of the present disclosure, each one of base stations 101-103 is capable of dynamically allocating uplink channel resources to subscriber stations 111-116 according to the number of subscriber stations that will be receiving downlink data transmissions and will be required therefore to send ACK or NACK messages (and associated pilot signals) back to a transmitting base station. The uplink channel resources may be independently and selectively allocated for each transmission, rather than being permanently dedicated to particular subscriber stations.

Figure 3:
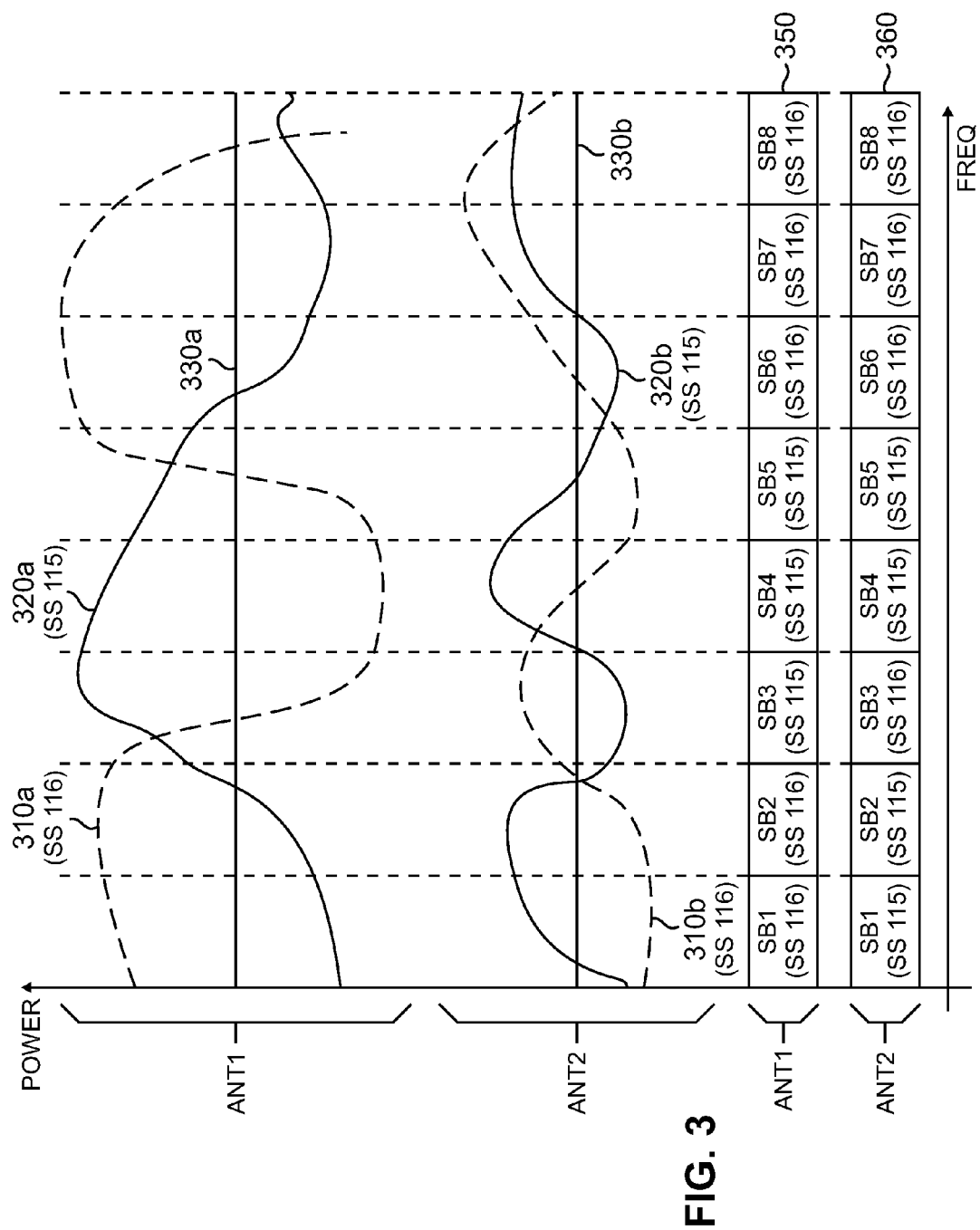
FIG. 3 illustrates the allocation of subcarriers in a wireless network according to one embodiment of the disclosure.

FIG. 3 illustrates the allocation of subcarriers in wireless network 100 according to one embodiment of the present disclosure. In this example, a total of 512 OFDM subcarriers (or tones) are divided into 8 groups (or subbands) of 64 contiguous subcarriers (SCs) each. By way of example, the first subband, SB1, contains subcarriers SC1-SC64, the second subband, SB2, contains subcarriers SC65-SC128, and so forth. The eighth (last) subband, SB8, contains subcarriers SC449-SC512.

A given subscriber station (e.g., SS 116 or SS 115) may be allocated one or more of these subbands. In a conventional base station, a MIMO spatial multiplexing antenna array using OFDMA allocates the same subband on each transmit antenna to the same subscriber station. Thus, in a conventional base station, if SS 116 is allocated subband SB1 on antenna ANT1, then SS 116 must also be allocated subband SB1 on antenna ANT2.

In FIG. 3, the eight subbands, SB1-SB8, are allocated according to channel fading at the receiver for the case of two transmit antennas, ANT1 and ANT2, and two subscriber stations, SS 115 and SS 116. The received signals at SS 116 and SS 115 from each of the two transmit antennas experience frequency-selective fading due to multipath effects. In case of uncorrelated antennas, the channel qualities from each of transmit antennas ATN1 and ANT2 at SS 115 and SS 116 are independent. Also, the channel from base station (BS) 102 to each of SS 115 and SS 116 is also independent due to the different locations of SS 115 and SS 116 within a cell. Therefore, SS 115 or SS 116 experience independent fading from each of the two transmit antennas as shown in FIG. 3.

Curve 330a represents a flat fading characteristic at antenna ANT1. Dotted-line curve 310a represents the frequency selective fading of the downlink signal from antenna ANT1 seen by the receiver of SS 116. Solid-line curve 320a represents the frequency selective fading of the downlink signal from antenna ANT1 seen by the receiver of SS 115.

Curve 330b represents a flat fading characteristic at antenna ANT2. Dotted-line curve 310b represents the frequency selective fading of the downlink signal from antenna ANT2 seen by the receiver of SS 116. Solid-line curve 320a represents the frequency selective fading of the downlink signal from antenna ANT2 seen by the receiver of SS 115.

A subscriber station is scheduled for transmission on a given subband on a given antenna if its channel quality on that particular subband for a particular antenna is better than all the other subscriber stations in the cell. It is also possible to take other QoS criteria into account when selecting subscriber stations for transmission. In the two subscriber station example in FIG. 3, SS 116 is in a relative up-fade on antenna ANT1 compared to SS 115 on subbands SB1, SB2, SB6, SB7 and SB8. Similarly, SS 115 is in a relative up-fade on antenna ANT1 compared to SS 116 on subbands SB3, SB4 and SB5. Thus, the relative fading at antenna ANT1 is used to determine subband allocation 350 for antenna ANT1 near the bottom of FIG. 3.

Likewise, in the two subscriber station example in FIG. 3, SS 116 is in a relative up-fade on antenna ANT2 compared to SS 115 on subbands SB3, SB6, SB7 and SB8. Similarly, SS 115 is in a relative up-fade on antenna ANT2 compared to SS 116 on subbands SB1, SB2, SB4 and SB5. Thus, the relative fading at antenna ANT2 is used to determine subband allocation 360 for antenna ANT2 near the bottom of FIG. 3.

Figure 4:
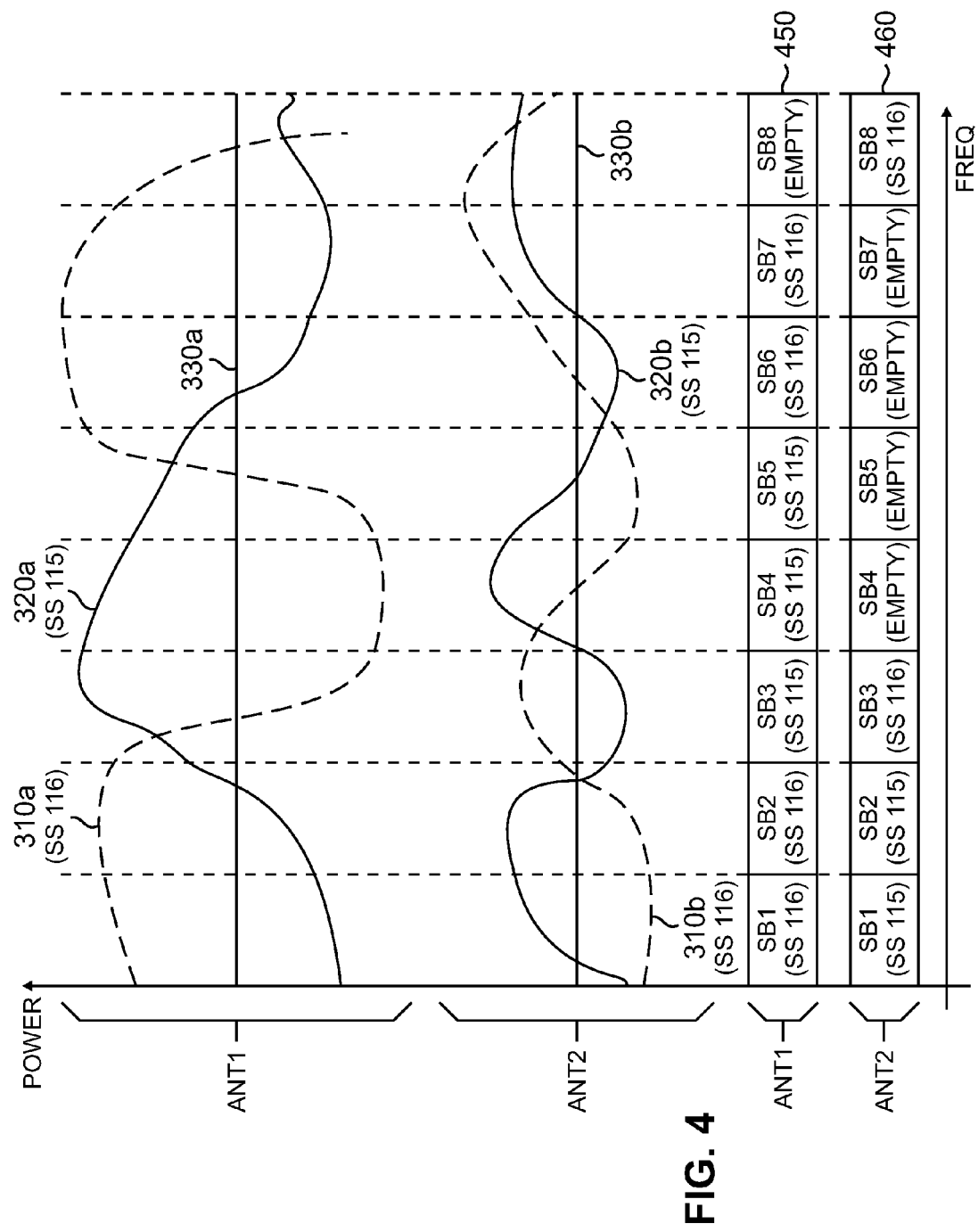
FIG. 4 illustrates an alternate allocation of subcarriers in a wireless network according to one embodiment of the disclosure.

FIG. 4 illustrates an alternate allocation of subcarriers in wireless network 100 according to one embodiment of the present disclosure. In the embodiment in FIG. 4, if a given subscriber station has the best channel fading characteristics in a given subband on both transmit antennas, then only one transmit antenna is used to transmit to that subscriber station on that subband. On the other antenna, that subband is left empty.

From FIG. 3, it is noted that SS 116 had the best fading characteristics on both ANT1 and ANT2 in subbands SB6, SB7 and SB8. It is further noted that SS 115 had the best fading characteristics on both ANT1 and ANT2 in subbands SB4 and SB5. Thus, in FIG. 4, subband SB8 is left empty in subband allocation 450 for antenna ANT1 near the bottom of FIG. 4, and SS 116 receives in subband SB8 only from antenna ANT2. Similarly, subbands SB4, SB5, and SB6 are left empty in subband allocation 460 for antenna ANT2 near the bottom of FIG. 4, and SS 116 receives in subbands SB6 and SB7 only from antenna ANT1 and SS 115 receives in subbands SB4 and SB5 only from antenna ANT1.

The present disclosure provides a mechanism for dynamic switching between single-user and multi-user MIMO, whereby a user always reports a single CQI assuming multi-user MIMO operation. In single-user MIMO mode, the base station uses the best stream CQI reported by the subscriber station to schedule the subscriber station and select modulation and coding schemes for all the MIMO streams. As this CQI value only applies to one stream, hybrid ARQ operation is used to recover the remaining streams. In some cases, when the best CQI stream is not decoded, the subscriber station tries to decode other streams. If the subscriber station decodes one or more other streams, the subscriber station cancels the successfully decoded streams to reduce the interference in the overall received signal and then decodes again the streams that previously failed.

Figure 5:
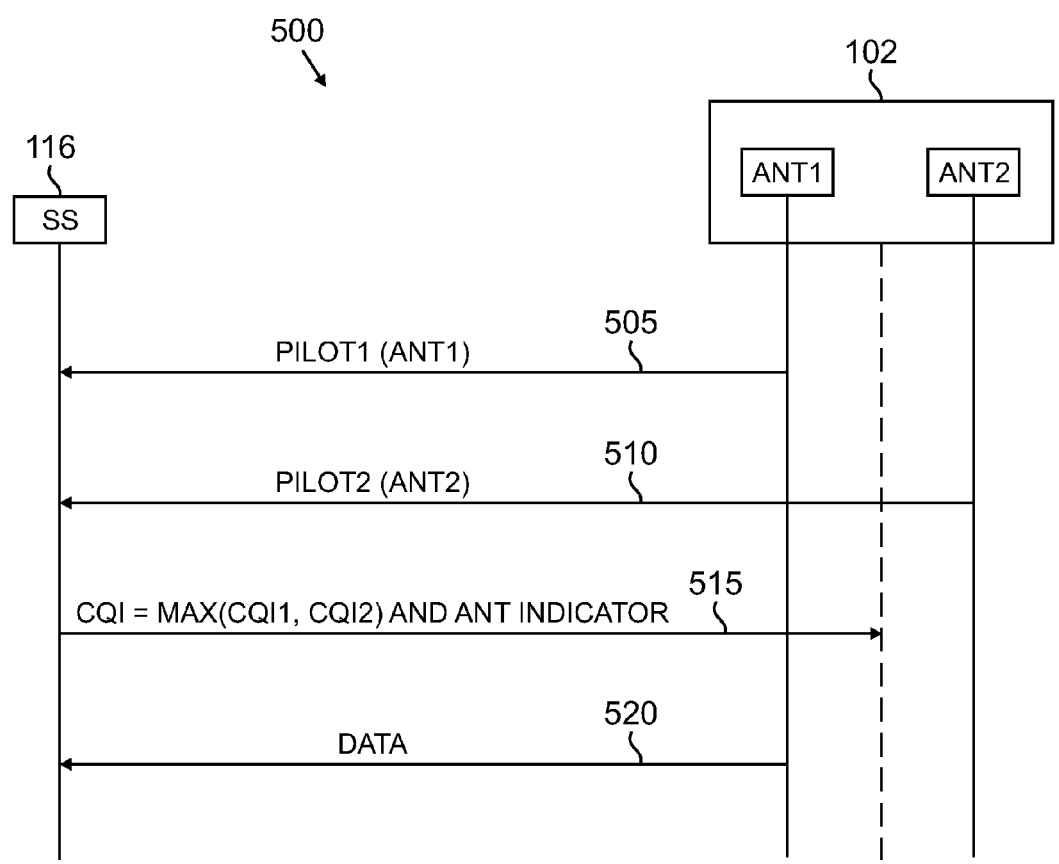
FIG. 5 is a message flow diagram that illustrates CQI feedback and scheduling in a wireless network according to one embodiment of the disclosure.

FIG. 5 depicts message flow diagram 500, which illustrates CQI feedback and scheduling in wireless network 100 according to one embodiment of the present disclosure. In FIG. 5, a multi-user 2×2 MIMO scenario is assumed. Initially, base station (BS) 102 transmits a first pilot signal, Pilot1, from antenna ANT1 (process step 505) and transmits a second pilot signal, Pilot2, from antenna ANT2 (process step 510). Subscriber station (SS) 116 receives the Pilot1 signal and calculates a first channel quality indicator value, CQI1, from the measured Pilot1 signal using, for example, a linear minimum mean square error (LMMSE) operation. SS 116 also receives the Pilot2 signal and calculates a second channel quality indicator value, CQI2, from the measured Pilot2 signal using, for example, a linear minimum mean square error (LMMSE) operation.

SS 116 then determines the best CQI value between CQI1 and CQI2, such that CQI=max(CQI1,CQI2). SS 116 then transmits to BS 102 the best CQI value and an antenna indicator value (ANT) that identifies which of the two antennas, ANT1 or ANT2, is associated with the best CQI value (process step 515). BS 102 may then schedule a downlink Data transmission for SS 116 on the identified (or selected) antenna using a modulation and coding scheme (MCS) that corresponds to the reported best CQI value (process step 520). By way of example, the ANT indicator value indicated that antenna ANT1 was associated with the best reported CQI value. Therefore, in process step 520, BS 102 transmits a Data block from antenna ANT1 to SS 102 using a modulation and coding scheme corresponding to the CQI1 value. Similarly, another user (e.g., SS 115) that reports a better CQI on the other antenna may be selected for transmission using the same resource (i.e., time-frequency slot) on the other antenna.

Figure 6:
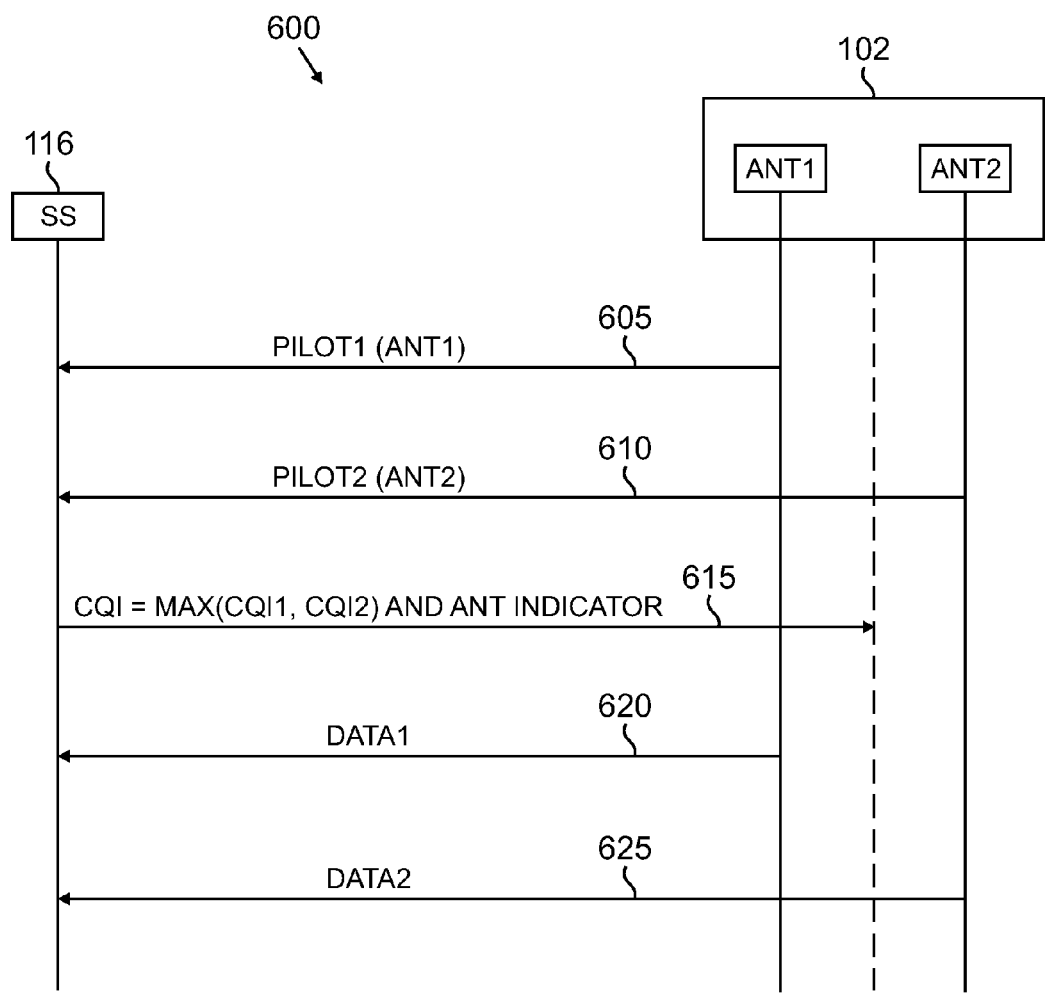
FIG. 6 is a message flow diagram that illustrates CQI feedback and scheduling in a wireless network according to another embodiment of the present disclosure.

FIG. 6 depicts message flow diagram 600, which illustrates CQI feedback and scheduling in wireless network 100 according to another embodiment of the present disclosure. In FIG. 6, a single-user 2×2 MIMO scenario is assumed. Initially, base station (BS) 102 transmits a first pilot signal, Pilot1, from antenna ANT1 (process step 605) and transmits a second pilot signal, Pilot2, from antenna ANT2 (process step 610). Subscriber station (SS) 116 receives the Pilot1 signal and calculates a first channel quality indicator value, CQI1, from the measured Pilot1 signal using, for example, a linear minimum mean square error (LMMSE) operation. SS 116 also receives the Pilot2 signal and calculates a second channel quality indicator value, CQI2, from the measured Pilot2 signal using, for example, a linear minimum mean square error (LMMSE) operation.

SS 116 then determines the best CQI value between CQI1 and CQI2, such that CQI=max(CQI1,CQI2). SS 116 then transmits to BS 102 the best CQI value and an antenna indicator value (ANT) that identifies which of the two antennas, ANT1 or ANT2, is associated with the best CQI value (process step 615).

BS 102 may then schedule a downlink data transmission for SS 116 in a single-user MIMO mode, with signals transmitted to SS 116 from both the ANT1 antenna and the ANT2 antenna. BS 102 selects the same modulation and coding scheme (MCS) on both antennas (ANT1 and ANT2) based on the single CQI feedback value from process step 615. The selected modulation and coding scheme applies to the best antenna stream at that time, but is nonetheless used for both antennas. Thus, in FIG. 6, if the CQI value transmitted back to BS 102 in process step 615 corresponded to CQI2 and antenna ANT2, then BS 102 transmits Data1 stream from antenna ANT1 (process step 620) using the MCS corresponding to antenna ANT2 and transmits Data2 stream from antenna ANT2 (process step 625) using the same MCS corresponding to antenna ANT2.

This may result in inaccurate MCS selection for the lower CQI value (i.e., CQI1 on ANT1), but a hybrid ARQ scheme is used to compensate for errors. SS 116 may cancel the first decoded stream in a single-user MIMO scenario which can actually improve the SINR for the stream that is decoded second. In a situation where the selected MCS for the lower CQI stream happens to be more robust due to channel up-fade at the time of actual transmission due to CQI feedback delay, the second stream may be decodable even when the first stream fails. In that event, the second stream may be cancelled and the receiver (e.g., SS 116) may try to decode the stream that failed on the first attempt.

Figure 7:
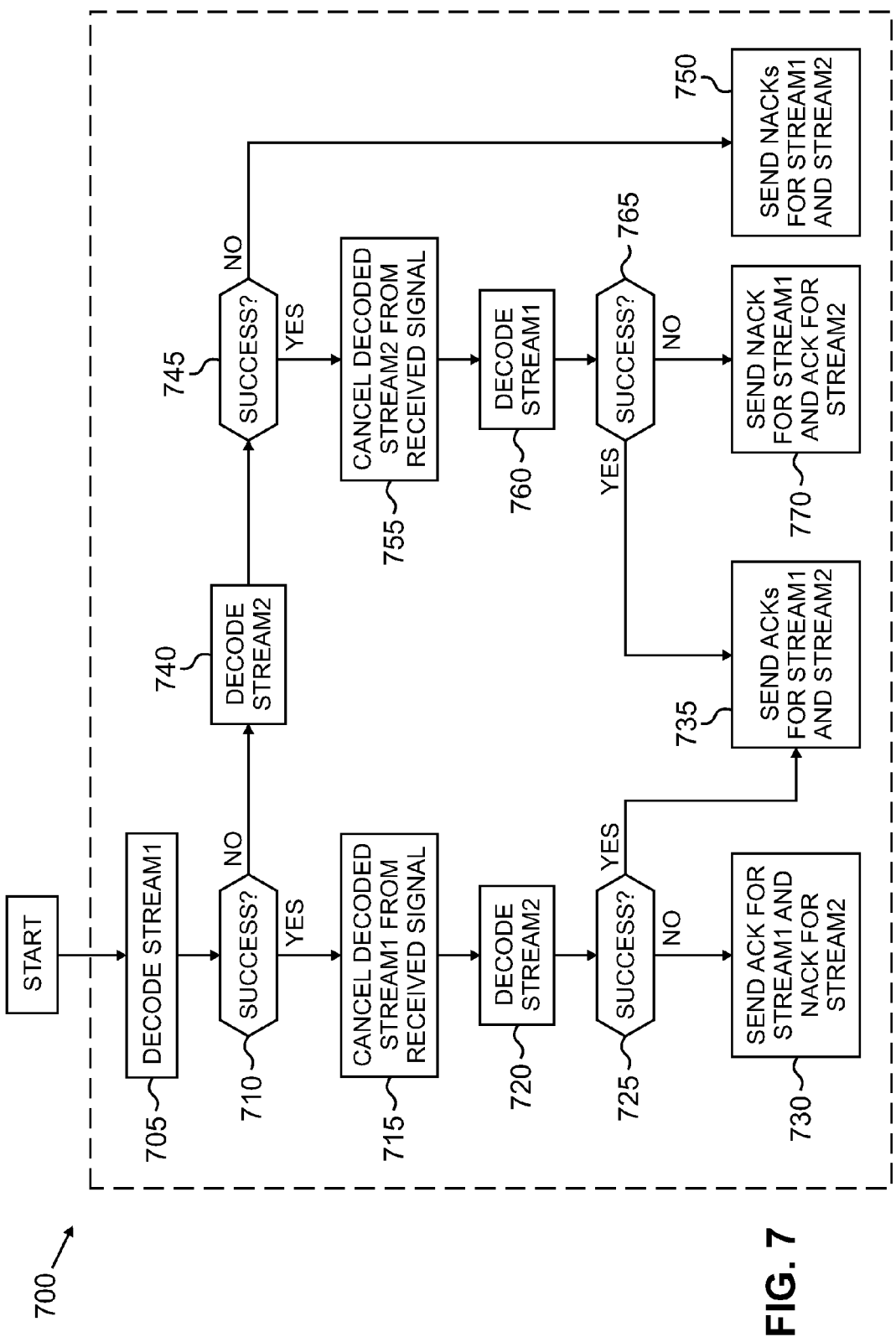
FIG. 7 is a message flow diagram that illustrates interference cancellation and a hybrid ARQ protocol for two MIMO streams according to an embodiment of the present disclosure.

FIG. 7 depicts message flow diagram 700, which illustrates interference cancellation and a hybrid acknowledge request (ARQ) protocol for two multiple-input, multiple-output (MIMO) streams in wireless network 100 according to another embodiment of the present disclosure. In FIG. 7, two downlink transmissions, Stream1 and Stream2, are transmitted to the same user (e.g., SS 116). SS 116 may perform, for example, an LMMSE operation to suppress the inter-stream interference.

Initially, SS 116 tries to decode Stream1 (process step 705). If the Stream1 decoding is successful (Yes in process step 710), SS 116 cancels decoded Stream1 from the overall received signal (process step 715) and then tries to decode Stream2 (process step 720). If the Stream2 decoding is unsuccessful (No in process step 725), SS 116 sends BS 102 an ACK message for Stream1 and a NACK message for Stream2 (process step 730). If the Stream2 decoding is successful (Yes in process step 725), SS 116 sends BS 102 an ACK message for Stream1 and an ACK message for Stream2 (process step 735).

If the initial decoding of Stream1 is unsuccessful (No in process step 710), SS 116 tries to decode Stream2 (process step 740). If the Stream2 decoding is unsuccessful (No in process step 745), SS 116 sends BS 102 a NACK message for Stream1 and a NACK message for Stream2 (process step 750). If the Stream2 decoding is successful (Yes in process step 745), SS 116 cancels decoded Stream2 from the overall received signal (process step 755) and then tries to decode Stream1 again (process step 760). If the Stream1 decoding is again unsuccessful (No in process step 765), SS 116 sends BS 102 a NACK message for Stream1 and an ACK message for Stream2 (process step 770). If the Stream1 decoding is successful (Yes in process step 765), SS 116 sends BS 102 an ACK message for Stream1 and an ACK message for Stream2 (process step 735).

In case of NACK messages for both streams, ES 102 transmits additional redundancy information using Hybrid ARQ protocol for both the streams. In case a NACK message for only one stream, BS 102 transmits the redundant information only for the failed stream.

Figure 8:
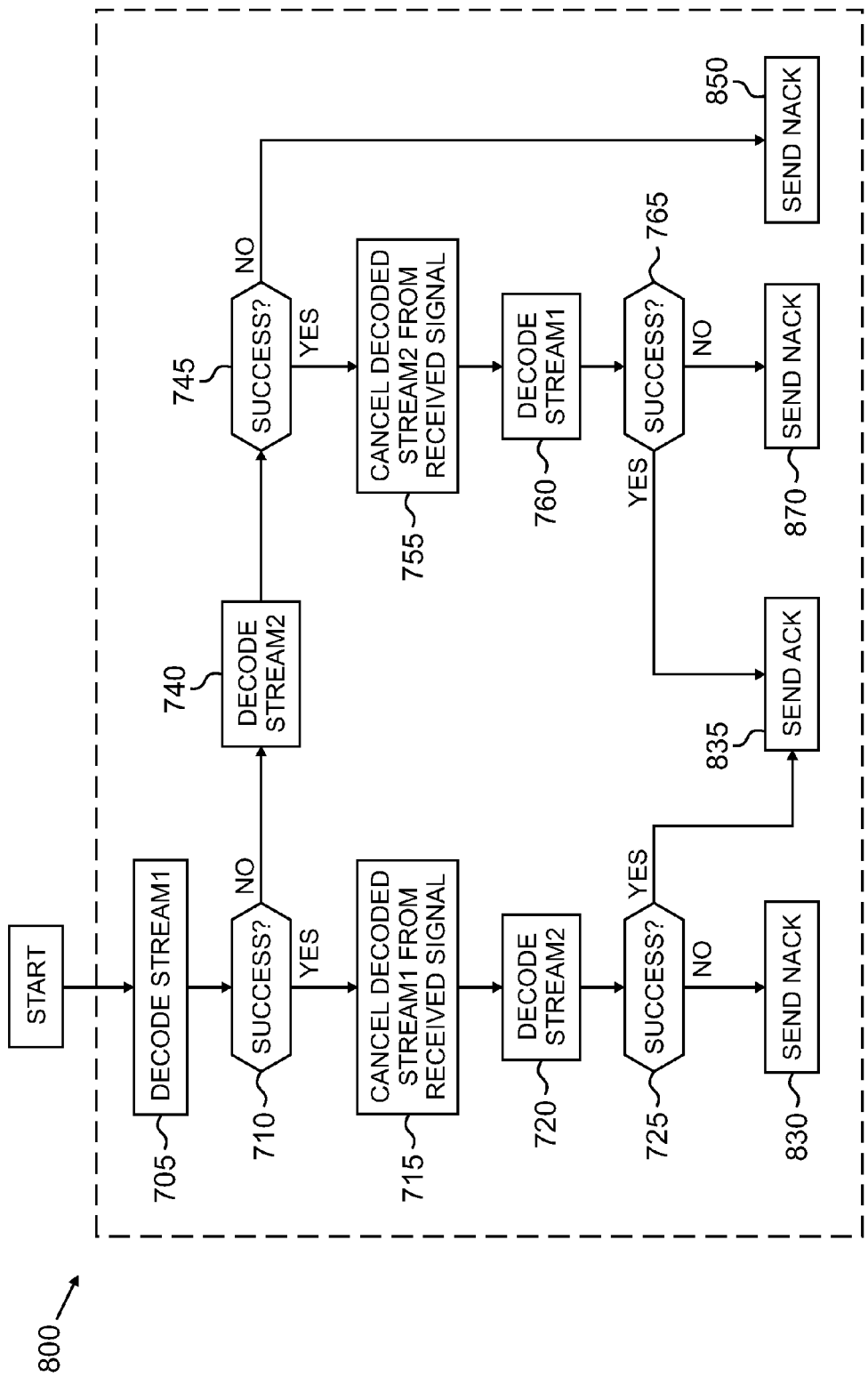
FIG. 8 is a message flow diagram that illustrates interference cancellation and a hybrid ARQ protocol for two MIMO streams according to another embodiment of the present disclosure.

FIG. 8 depicts message flow diagram 800, which illustrates interference cancellation and a hybrid ARQ protocol for two MIMO streams according to another embodiment of the present disclosure. FIG. 8 is substantially identical to FIG. 7, except that a single ACK/NACK message is sent in process steps 830, 835, 850 and 870 as a result of the decoding attempt for both the streams. This is different than process steps 730, 735, 750 and 770, which use multiple ACK/NACK messages.

In FIG. 8, an ACK signal is sent when both streams are successful (process step 835) and a NACK signal is sent when either one stream or both streams fail (process steps 830, 850 and 870). This approach reduces ACK/NACK feedback signaling overhead. As a result of a NACK signal, BS 102 transmits redundant information using the hybrid ARQ protocol for both streams. In the case of an ACK signal, BS 102 moves on to new packet transmissions to the same subscriber station or a different subscriber station.

Figure 9:
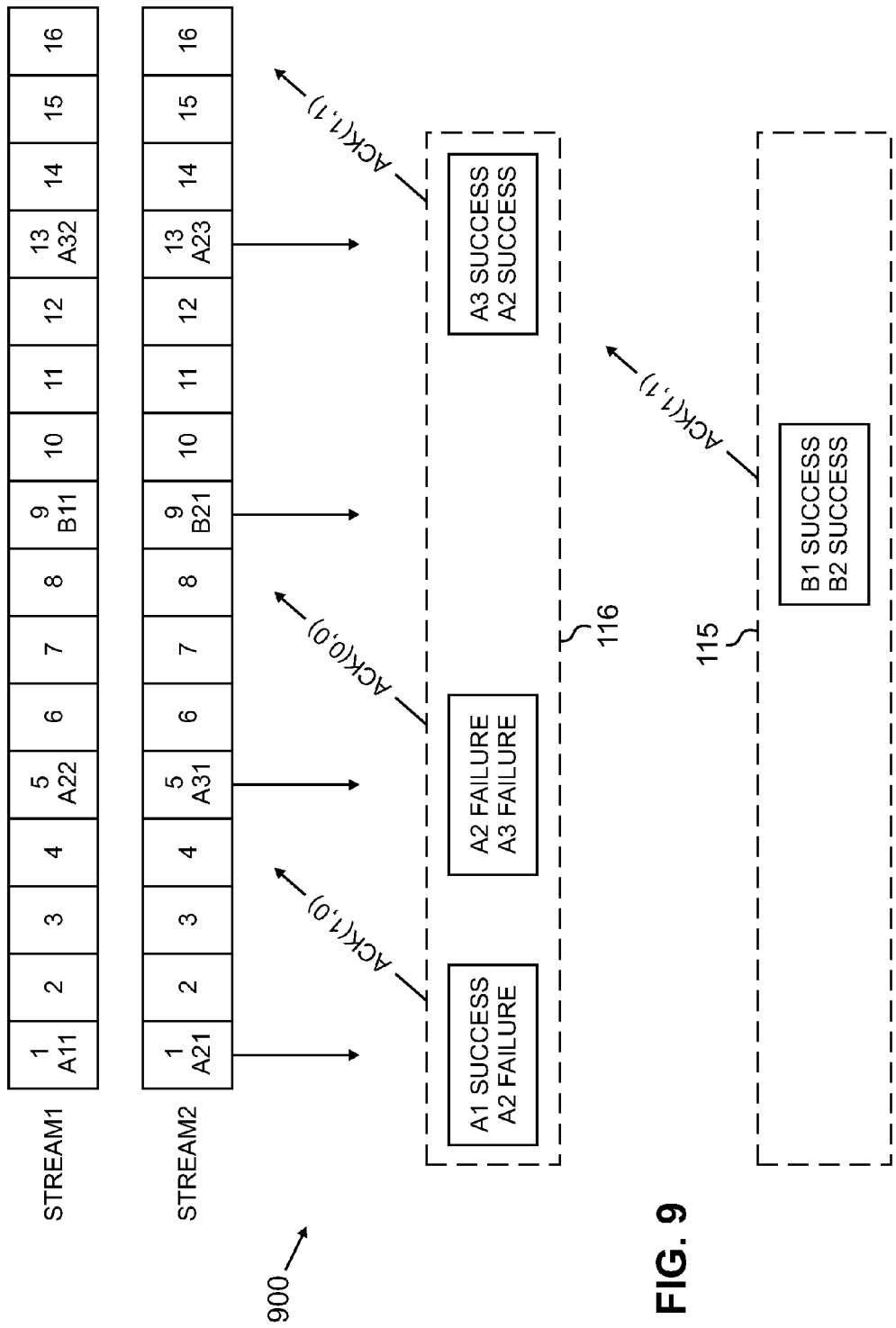
FIG. 9 is a message flow diagram illustrating single-user, multi-code word, MIMO hybrid ARQ operation according to another embodiment of the present disclosure.

FIG. 9 depicts message flow diagram 900, which illustrates single-user multi-code word MIMO hybrid ARQ operation according to another embodiment of the present disclosure. In FIG. 9, three data packets, A1, A2 and A3, are to be transmitted to SS 116, while two other data packets, B1 and B2, are to be transmitted to another subscriber station (e.g., SS 115). At the top of FIG. 9, sixteen downlink subframes (SF1-SF16) are shown for each of two antennas (ANT1 and ANT 2). Antenna ANT1 transmits Stream1 and antenna ANT2 transmits Stream2.

In the first subframe (SF1), BS 102 transmits data subpacket A11 from data packet A1 to SS 116 in Stream1 and transmits data subpacket A21 from data packet A2 in Stream2. SS 116 successfully decodes original data packet A1 from data subpacket A11, but fails to decode original data packet A2 from subpacket A21. As a result, SS 116 transmits a hybrid ARQ acknowledgement message, ACK(1,0), back to BS 102. The ACK(1,0) message indicates a success (ACK=1) for Stream1 and indicates a failure (ACK=1) for Stream2.

In the fifth subframe (SF5), BS 102 transmits new data subpacket A31 from new data packet A3 to SS 116 in Stream2. Since data packet A2 was not successfully decoded in subframe SF1, BS 102 transmits in Stream1 a second data subpacket A22 associated with original data packet A2. Alternatively, BS 102 could transmit subpacket A22 on Stream2, while the new transmission of subpacket A31 occurs in Stream1.

SS 116 then attempts to decode original data packet A2 by combining data subpackets A21 and A22 and attempts to decode original data packet A3 from subpacket A31. In FIG. 9, it is assumed that SS 116 again fails to decode original data packet A2 and also fails to decode original data packet A3. As a result, SS 116 transmits the hybrid ARQ message, ACK(0, 0), to BS 102. The ACK(0,0) message indicates a failure (ACK=0) for Stream1 and a failure (ACK=0) for Stream2.

In the ninth subframe (SF9), BS 102 transmits new data subpacket B11 from new data packet B1 to SS 115 in Stream1 and transmits new data subpacket B21 from data packet B2 in Stream2. SS 115 successfully decodes original data packet B1 from data subpacket B11 and successfully decodes original data packet B2 from subpacket B21. As a result, SS 115 transmits a hybrid ARQ acknowledgement message, ACK(1, 1), back to BS 102. The ACK(1,1) message indicates a success (ACK=1) for Stream1 and a success (ACK=1) for Stream2.

In the thirteenth subframe (SF13), BS 102 resumes Hybrid ARQ transmission to SS 116 of packets A2 and A3. BS 102 transmits to SS 116 data subpacket A32 from data packet A3 in Stream1 and transmits data subpacket A23 from data packet A2 in Stream2. SS 116 then attempts to decode original data packet A2 by combining data subpackets A21, A22, and A23 and attempts to decode original data packet A3 by combining data subpackets A31 and A32. Assuming SS 116 successfully decodes original data packets A2 and A3, SS 116 transmits a hybrid ARQ acknowledgement message, ACK(1, 1), back to BS 102. The ACK(1,1) message indicates a success (ACK=1) for Stream1 and a success (ACK=1) for Stream2.

Figure 10:
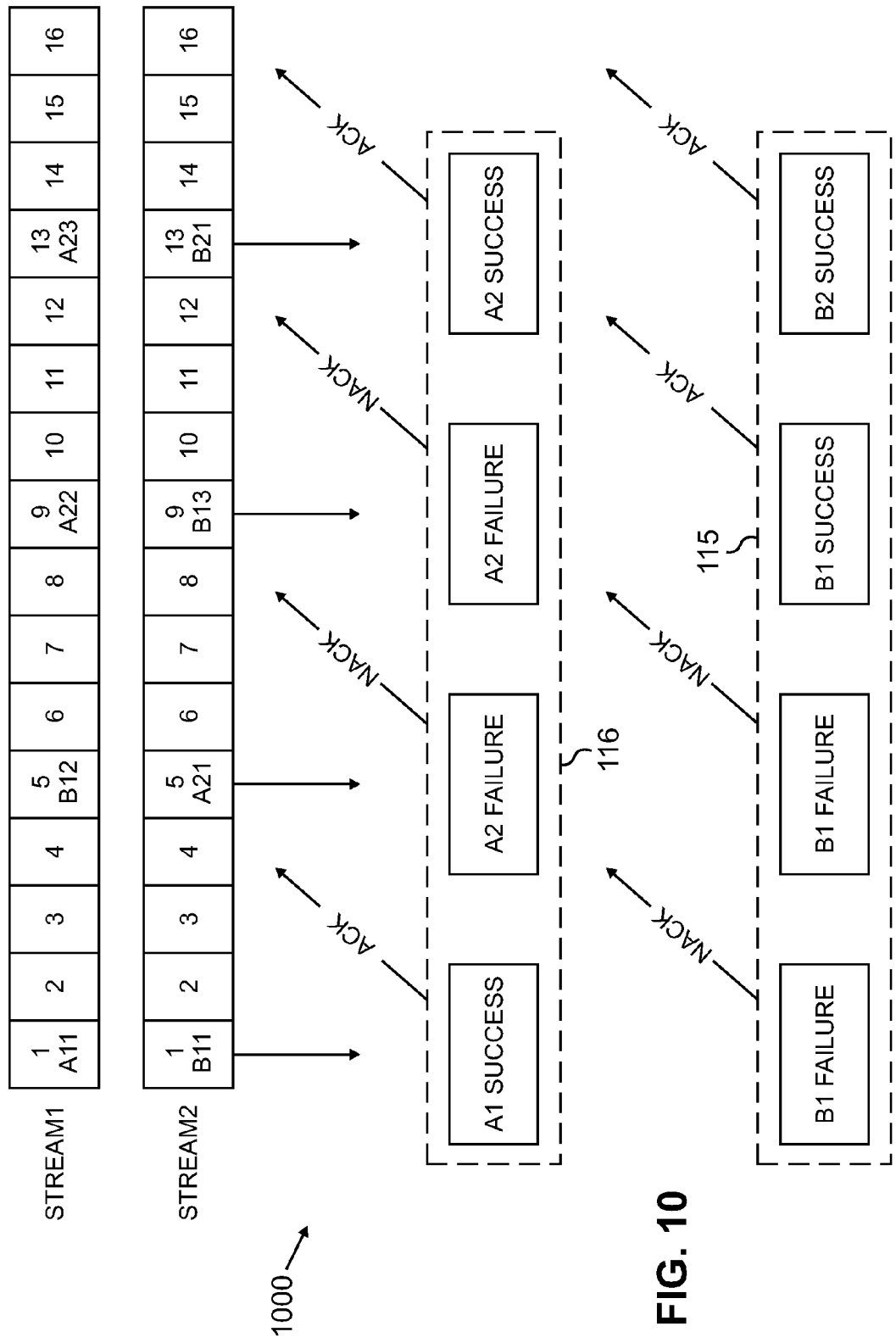
FIG. 10 is a message flow diagram illustrating multi-user, multi-code word, MIMO hybrid ARQ operation according to another embodiment of the present disclosure.

FIG. 10 depicts message flow diagram 1000, which illustrates multi-user, multi-code word, MIMO hybrid ARQ operation according to another embodiment of the present disclosure. In the case of multi-user, multi-code word, MIMO Hybrid ARQ operation, data subpackets may be sent to different subscriber stations on different MIMO streams. A receiving subscriber station provides hybrid ARQ feedback only for the data stream it receives.

In FIG. 10, base station 102 attempts to transmit to SS 116 original data packets A1 and A2 and attempts to transmit to SS 115 original data packets B1 and B2. In the first subframe (SF1), BS 102 transmits a first data subpacket A11 from original data packet A1 to SS 116 in Stream1 and transmits a first data subpacket B11 from original data packet B1 to SS 115 in Stream2. SS 116 successfully decodes original data packet A1 from data subpacket A11, but fails to decode original data packet B1 from subpacket B11. Thus, SS 116 transmits an ACK message to BS 102 and SS 115 transmits a NACK message to BS 102.

In the fifth subframe (SF5), BS 102 transmits a first data subpacket A21 from original data packet A2 to SS 116 in Stream2 and transmits a second data subpacket B12 from original data packet B1 to SS 115 in Stream1. SS 116 fails to decode original data packet A2 from data subpacket A21 and fails to decode original data packet B1 from the combined subpackets B11 and B12. Thus, SS 116 transmits a NACK message to BS 102 and SS 115 also transmits a NACK message to BS 102.

In the ninth subframe (SF9), BS 102 transmits a second data subpacket A22 from original data packet A2 to SS 116 in Stream1 and transmits a third data subpacket B13 from original data packet B1 to SS 115 in Stream2. SS 116 fails to decode original data packet A2 from combined data subpackets A21 and A22, but successfully decodes original data packet B1 from the combined subpackets B11, B12 and B13. Thus, SS 116 transmits a NACK message to BS 102 and SS 115 transmits an ACK message to BS 102.

Finally, in the thirteenth subframe (SF13), BS 102 transmits a third data subpacket A23 from original data packet A2 to SS 116 in Stream1 and transmits a first data subpacket B21 from original data packet B2 to SS 115 in Stream2. SS 116 successfully decodes original data packet A2 from combined data subpackets A21, A22 and A23 and successfully decodes original data packet B2 from data subpacket B21. Thus, SS 116 transmits an ACK message to BS 102 and SS 115 transmits an ACK message to BS 102.

Figure 11:
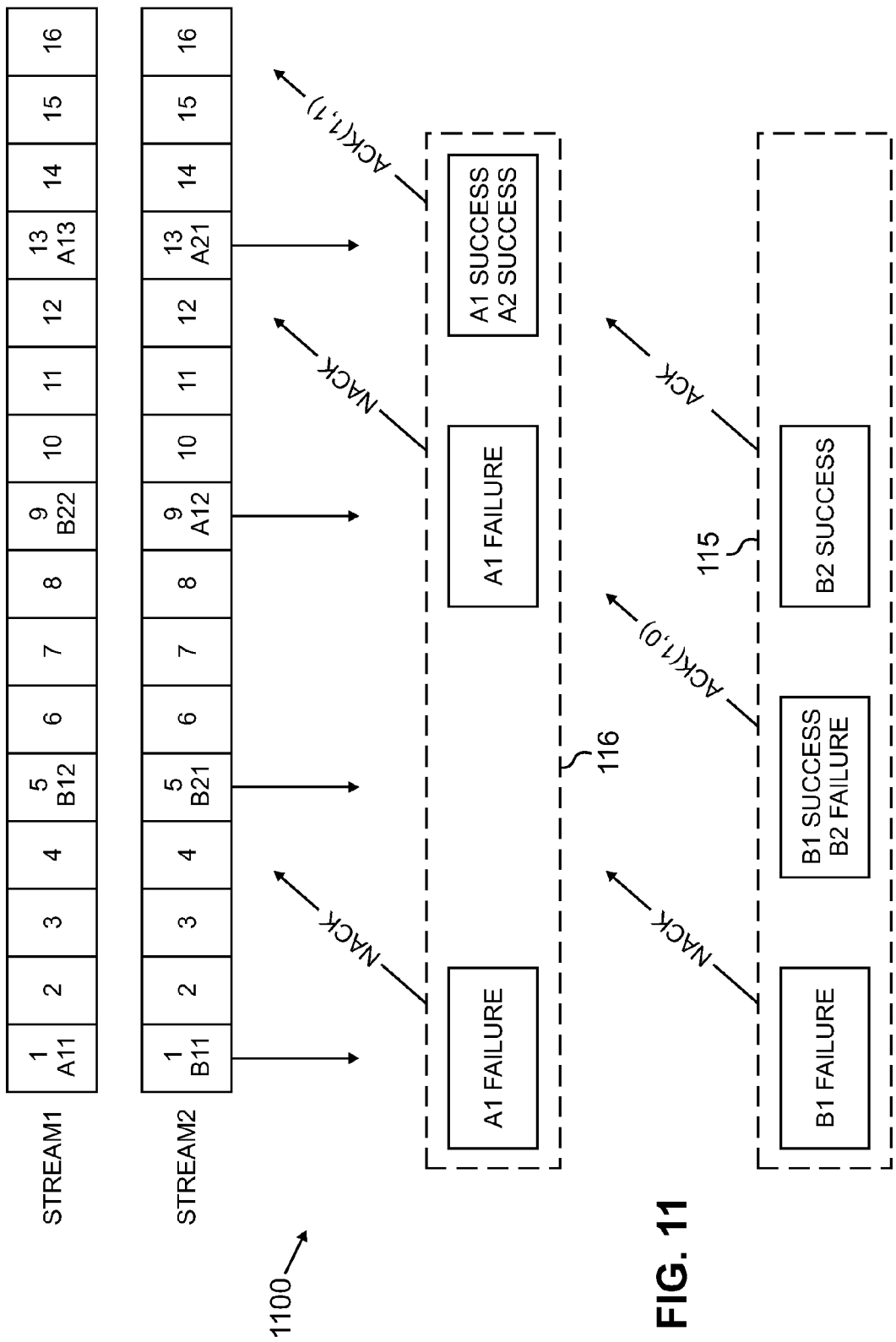
FIG. 11 is a message flow diagram illustrating switching between single-user, multi-code word, MIMO hybrid ARQ operation and multi-user, multi-code word, MIMO hybrid ARQ operation according to the principles of the present disclosure.

FIG. 11 depicts message flow diagram 1100, which illustrates switching between single-user, multi-code word, MIMO hybrid ARQ operation and multi-user, multi-code word, MIMO hybrid ARQ operation according to the principles of the present disclosure. In FIG. 11, base station 102 attempts to transmit to SS 116 original data packets A1 and A2 and attempts to transmit to SS 115 original data packets B1 and B2.

In the first subframe (SF1), BS 102 operates in multi-user MIMO mode and transmits to SS 116 in Stream1 and to SS 115 in Stream2. In the fifth subframe (SF5), BS 102 switches to single-user MIMO mode and transmits to SS 115 only using both Stream1 and Stream2. In the ninth subframe (SF9), BS 102 switches back to multi-user MIMO mode and transmits to SS 116 in Stream2 and to SS 115 in Stream1. In the thirteenth subframe (SF13), BS 102 again switches to single-user MIMO mode and transmits to SS 116 only using both Stream1 and Stream2.

Operating in multi-user MIMO mode in the first subframe (SF1), BS 102 transmits a first data subpacket A11 from original data packet A1 to SS 116 in Stream1 and transmits a first data subpacket B11 from original data packet B1 to SS 115 in Stream2. SS 116 fails to decode original data packet A1 from data subpacket A11 and SS 115 fails to decode original data packet B1 from subpacket B11. Thus, SS 116 transmits a NACK message to BS 102 and SS 115 transmits a NACK message to BS 102.

Operating in single-user MIMO mode in the fifth subframe (SF5), BS 102 transmits a second data subpacket B12 from original data packet B1 to SS 115 in Stream1 and transmits a first data subpacket B21 from original data packet B2 to SS 115 in Stream2. SS 115 successfully decodes original data packet B1 from combined data subpackets B11 and B12, but fails to decode original data packet B2 from data subpacket B21. Thus, SS 116 transmits to BS 102 an acknowledgment message, ACK(1,0), indicating a success (ACK=1) for Stream1 (i.e., packet B1) and a failure (ACK=0) for Stream2 (i.e., packet B2).

Operating again in multi-user MIMO mode in the ninth subframe (SF9), BS 102 transmits a second data subpacket A12 from original data packet A1 to SS 116 in Stream2 and transmits a second data subpacket B22 from original data packet B2 to SS 115 in Stream1. SS 116 fails to decode original data packet A1 from combined data subpacket A11 and A12 and SS 115 successfully decodes original data packet B2 from combined data subpackets B21 and B22. Thus, SS 116 transmits a NACK message to BS 102 and SS 115 transmits an ACK message to BS 102.

Operating again in single-user MIMO mode in the thirteenth subframe (SF13), BS 102 transmits a third data subpacket A13 from original data packet A1 to SS 116 in Stream1 and transmits a first data subpacket A21 from original data packet A2 to SS 116 in Stream2. SS 116 successfully decodes original data packet A1 from combined data subpackets A11, A12 and A13 and successfully decodes original data packet A2 from data subpacket A21. Thus, SS 116 transmits to BS 102 an acknowledgment message, ACK(1,1), indicating a success (ACK=1) for Stream1 (i.e., packet A1) and a success (ACK=1) for Stream2 (i.e., packet A2).

The hybrid ARQ process for a pending packet continues from the point where it is preempted. For example, transmission of packet A1 (subpacket A12) to SS 116 is preempted in subframe SF5 and resumes in subframe SF9 after BS 102 serves SS 115 on both streams in subframe SF5.

The above descriptions are generally directed to a base station (BS 102) that uses two antennas (ANT1 and ANT2) to transmit to two subscriber stations (SS 116 and SS 115). However, this scenario was selected for the purpose of simplicity and clarity in explaining the operation of base stations and subscriber stations according to the principles of the present disclosure. Those skilled in the art will readily understand that the present disclosure is more generally applicable to a base station that uses M transmit antennas to transmit to subscriber stations according to a multiple-input, multiple-output (MIMO) protocol.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a base station for transmitting in a downlink to a plurality of subscriber stations using a plurality of antennas according to a multiple input, multiple-output (MIMO) protocol, wherein, during a first downlink subframe, the base station is configured to operate in single-user MIMO mode in which the base station transmits a first data subpacket to a first subscriber station using a first antenna and transmits a second data subpacket to the first subscriber station using a second antenna, wherein, during a second downlink subframe following the first downlink subframe, the base station is configured to operate in multi-user MIMO mode in which the base station transmits a third data subpacket to the first subscriber station using the first antenna and transmits a fourth data subpacket to a second subscriber station using the second antenna, the first, second, third, and fourth data subpackets generated from original data packets using at least one error correction technique, wherein the base station is configured to alternate between operating in single-user MIMO mode and operating in multi-user MIMO mode repeatedly within a single frame.

2. The base station as set forth in claim 1, wherein the first data subpacket is generated from a first original data packet and the second data subpacket is generated from a second original data packet different than the first original data packet and wherein the third data subpacket is generated from one of the first and second original data packets.

3. The base station as set forth in claim 1, wherein, subsequent to the first downlink subframe, the base station is configured to receive from the first subscriber station a first acknowledgment signal and a second acknowledgment signal indicating whether the first data subpacket and the second data subpacket were received correctly.

4. The base station as set forth in claim 3, wherein, subsequent to the second downlink subframe, the base station is configured to receive from the first subscriber station a third acknowledgment signal indicating whether the third data subpacket was received correctly and receives from the second subscriber station a fourth acknowledgment signal indicating whether the fourth data subpacket was received correctly.

5. The base station as set forth in claim 1, wherein, during a third downlink subframe following the second downlink subframe, the base station is configured to operate in single-user MIMO mode in which the base station transmits a fifth data subpacket to the first subscriber station using the first antenna and transmits a sixth data subpacket to the first subscriber station using the second antenna.

6. The base station as set forth in claim 5, wherein the first data subpacket is generated from a first original data packet and the second data subpacket is generated from a second original data packet different than the first original data packet and wherein the third data subpacket is generated from one of the first and second original data packets and the fifth data subpacket is generated from one of the first and second original data packets.

7. The base station as set forth in claim 1, wherein the base station is configured to select a modulation and coding scheme for transmitting from the first and second antennas to the first subscriber station during single-user MIMO mode based on a first channel quality indicator (CQI1) value associated with the first antenna and a second channel quality indicator (CQI2) value associated with the second antenna, wherein the selected modulation and coding scheme corresponds to a better one of the CQI1 value and the CQI2 value.

8. The base station as set forth in claim 1, wherein the error correction technique comprises a hybrid acknowledge request (HARQ) error correction technique.

9. A wireless network comprising a plurality of base stations for communicating with subscriber stations in a coverage area of the wireless network, wherein each of the base stations transmits in a downlink to a plurality of subscriber stations using a plurality of antennas according to a multiple input, multiple-output (MIMO) protocol, wherein, during a first downlink subframe, each base station is configured to operate in single-user MIMO mode in which the base station transmits a first data subpacket to a first subscriber station using a first antenna and transmits a second data subpacket to the first subscriber station using a second antenna, wherein, during a second downlink subframe following the first downlink subframe, each base station is configured to operate in multi-user MIMO mode in which the base station transmits a third data subpacket to the first subscriber station using the first antenna and transmits a fourth data subpacket to a second subscriber station using the second antenna, the first, second, third, and fourth data subpackets generated from original data packets using at least one error correction technique, wherein each base station is configured to alternate between operating in single-user MIMO mode and operating in multi-user MIMO mode repeatedly within a single frame.

10. The wireless network as set forth in claim 9, wherein the first data subpacket is generated from a first original data packet and the second data subpacket is generated from a second original data packet different than the first original data packet and wherein the third data subpacket is generated from one of the first and second original data packets.

11. The wireless network as set forth in claim 9, wherein, subsequent to the first downlink subframe, each base station is configured to receive from the first subscriber station a first acknowledgment signal and a second acknowledgment signal indicating whether the first data subpacket and the second data subpacket were received correctly.

12. The wireless network as set forth in claim 11, wherein, subsequent to the second downlink subframe, each base station is configured to receive from the first subscriber station a third acknowledgment signal indicating whether the third data subpacket was received correctly and receives from the second subscriber station a fourth acknowledgment signal indicating whether the fourth data subpacket was received correctly.

13. The wireless network as set forth in claim 9, wherein, during a third downlink subframe following the second downlink subframe, each base station is configured to operate in single-user MIMO mode in which the each base station transmits a fifth data subpacket to the first subscriber station using the first antenna and transmits a sixth data subpacket to the first subscriber station using the second antenna.

14. The wireless network as set forth in claim 13, wherein the first data subpacket is generated from a first original data packet and the second data subpacket is generated from a second original data packet different than the first original data packet and wherein the third data subpacket is generated from one of the first and second original data packets and the fifth data subpacket is generated from one of the first and second original data packets.

15. The wireless network as set forth in claim 9, wherein each base station is configured to select a modulation and coding scheme for transmitting from the first and second antennas to the first subscriber station during single-user MIMO mode based on a first channel quality indicator (CQI1) value associated with the first antenna and a second channel quality indicator (CQI2) value associated with the second antenna, wherein the selected modulation and coding scheme corresponds to a better one of the CQI1 value and the CQI2 value.

16. A subscriber station for communicating with a base station of a wireless network, the base station configured to transmit in a downlink using a plurality of antennas according to a multiple input, multiple-output (MIMO) protocol,
wherein the subscriber station, during a first downlink subframe in which the base station operates in single-user MIMO mode, is configured to receive a first data subpacket transmitted from a first antenna of the base station and to receive a second data subpacket transmitted from a second antenna of the base station, and
wherein the subscriber station, during a second downlink subframe following the first downlink subframe in which the base station operates in multi-user MIMO mode, is configured to receive a third data subpacket transmitted from the first antenna of the base station, the first, second, and third data subpackets generated from original data packets using at least one error correction technique,
wherein the subscriber station is configured to receive data from the base station as the base station alternates between operating in single-user MIMO mode and operating in multi-user MIMO mode repeatedly within a single frame.

17. The subscriber station as set forth in claim 16, wherein the first data subpacket is generated from a first original data packet and the second data subpacket is generated from a second original data packet different than the first original data packet and wherein the third data subpacket is generated from one of the first and second original data packets.

18. The subscriber station as set forth in claim 16, wherein the subscriber station, subsequent to the first downlink subframe, is configured to transmit to the base station a first acknowledgment signal and a second acknowledgment signal indicating whether the first data subpacket and the second data subpacket were received correctly.

19. The subscriber station as set forth in claim 18, wherein the subscriber station, subsequent to the first downlink subframe, is configured to transmit to the base station a third acknowledgment signal indicating whether the third data subpacket was received correctly.

20. The subscriber station as set forth in claim 16, wherein the subscriber station is configured to receive a first incoming signal from the first antenna and determine a first channel quality indicator (CQI1) value associated with the first antenna, and to receive a second incoming signal from the second antenna and determine a second channel quality indicator (CQI2) value associated with the second antenna.

21. The subscriber station as set forth in claim 20, wherein the subscriber station is configured to determine a better one of the CQI1 value and the CQI2 value and to transmit to the base station the better one of the CQI1 value and the CQI2 value and an antenna indicator value associated with the better one of the CQI1 value and the CQI2 value, wherein the base station is configured to select a modulation and coding scheme for transmitting from the first and second antennas to the subscriber station during single-user MIMO mode based on the better one of the CQI1 value and the CQI2 value.

* * * * *